(12) United States Patent
Hara et al.

(10) Patent No.: US 11,500,230 B2
(45) Date of Patent: Nov. 15, 2022

(54) OPTICAL DEVICE

(71) Applicant: ADVANTEST Corporation, Tokyo (JP)

(72) Inventors: Hideo Hara, Miyagi (JP); Shunsuke Abe, Miyagi (JP); Shin Masuda, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 17/265,941

(22) PCT Filed: Aug. 30, 2018

(86) PCT No.: PCT/JP2018/032224
§ 371 (c)(1),
(2) Date: Feb. 4, 2021

(87) PCT Pub. No.: WO2020/044516
PCT Pub. Date: Mar. 5, 2020

(65) Prior Publication Data
US 2021/0294132 A1  Sep. 23, 2021

(51) Int. Cl.
*G02F 1/065* (2006.01)
*G02B 6/122* (2006.01)
(Continued)

(52) U.S. Cl.
CPC .............. *G02F 1/065* (2013.01); *G02B 6/122* (2013.01); *G02F 1/0018* (2013.01); *G02F 1/035* (2013.01)

(58) Field of Classification Search
None
See application file for complete search history.

(56) References Cited

U.S. PATENT DOCUMENTS 9,664,931 B1 * 5/2017 Yap .................. G02F 1/225
9,829,727 B2 * 11/2017 Huang .............. G02B 6/122
(Continued)

FOREIGN PATENT DOCUMENTS

JP  2001-281480 A  10/2001
JP  2005-260005 A   9/2005
(Continued)

OTHER PUBLICATIONS

International Search Report, WIPO, Application No. PCT/JP2018/032224, daterd Oct. 30, 2018 (with English translation).
(Continued)

*Primary Examiner* — Michael Stahl
(74) *Attorney, Agent, or Firm* — Greenblum & Bernstein, P.L.C.

(57) ABSTRACT

According to the present invention, an optical device includes: a first electro-optical member and a second electro-optical member. The first electro-optical member has two convex portions spaced from each other by a recessed portion and a connecting portion arranged under the recessed portion to connect the two convex portions, the first electro-optical member exhibiting an electro-optical effect. The second electro-optical member has a recessed portion member arranged within the recessed portion, the second electro-optical member exhibiting an electro-optical effect. The permittivity of the first electro-optical member is higher than the permittivity of the second electro-optical member. The refractive index of the first electro-optical member is higher than the refractive index of the second electro-optical member. During application of an electric field, light to be transmitted is applied to the recessed portion member.

9 Claims, 4 Drawing Sheets

(51) Int. Cl.
*G02F 1/00* (2006.01)
*G02F 1/035* (2006.01)

(56) References Cited

U.S. PATENT DOCUMENTS

| | | |
|---|---|---|
| 2001/0026668 A1 | 10/2001 | Yamada |
| 2007/0009200 A1 | 1/2007 | Hochberg et al. |
| 2010/0021124 A1 | 1/2010 | Koos et al. |
| 2010/0322559 A1 | 12/2010 | Ogawa et al. |
| 2011/0170820 A1* | 7/2011 | Prather .................. G02F 1/065 359/321 |
| 2011/0255823 A1* | 10/2011 | Li ...................... G02B 6/12007 438/31 |
| 2013/0129293 A1 | 5/2013 | Ogawa et al. |
| 2016/0313579 A1* | 10/2016 | Yokoyama .............. G02F 1/365 |
| 2017/0045762 A1 | 2/2017 | Huang et al. |
| 2021/0208429 A1* | 7/2021 | Freude .................. G02F 1/065 |

FOREIGN PATENT DOCUMENTS

| | | | |
|---|---|---|---|
| JP | 2008-209522 A | | 9/2008 |
| JP | 2015-114631 A | * | 6/2015 |
| WO | 2009/107811 A1 | | 9/2009 |
| WO | 2011/108617 A1 | | 9/2011 |

OTHER PUBLICATIONS

International Preliminary Report on Patentability, WIPO, Application No. PCT/JP2018/032224, dated Mar. 2, 2021 (with English translation).

* cited by examiner

OPTICAL DEVICE

TECHNICAL FIELD

The present invention relates to an optical waveguide.

BACKGROUND ART

There has conventionally been known an optical waveguide with electro-optical polymer in between Si (see FIG. 12 of Patent Literature 1, for example). In accordance with such an optical waveguide, an electric field is applied in a concentrated manner to the electro-optical polymer. This causes a variation in the refractive index of the electro-optical polymer (electro-optical effect). In this state, the phase of light can be controlled when the light is applied to the electro-optical polymer.

It is noted that Patent Literature 2 (see FIG. 1A, for example) also discloses an optical waveguide having a structure similar to that of the above-described related art. It is also noted that Patent Literature 3 (see Abstract, for example) discloses a photonic crystal-based optical waveguide.

CITATION LIST

Patent Literature

Patent Literature 1: WO2011/108617
Patent Literature 2: WO2009/107811
Patent Literature 3: Japanese Patent Application Publication No. 2001-281480

SUMMARY OF THE INVENTION

Problems to be Solved by the Invention

However, in such related art optical waveguides as described above, the phase of light leaking from the electro-optical polymer cannot be controlled. That is, the phase of light applied to such optical waveguides cannot be controlled sufficiently.

It is hence an object of the present invention to better control the phase of light applied to an optical waveguide.

Means for Solving the Problem

According to the present invention, an optical device includes: a first electro-optical member having two convex portions spaced from each other by a recessed portion and a connecting portion arranged under the recessed portion to connect the two convex portions, the first electro-optical member exhibiting an electro-optical effect; and a second electro-optical member having a recessed portion member arranged within the recessed portion, the second electro-optical member exhibiting an electro-optical effect, wherein the permittivity of the first electro-optical member is higher than the permittivity of the second electro-optical member, the refractive index of the first electro-optical member is higher than the refractive index of the second electro-optical member, and during application of an electric field, light to be transmitted is applied to the recessed portion member.

According to the thus constructed optical device, a first electro-optical member has two convex portions spaced from each other by a recessed portion and a connecting portion arranged under the recessed portion to connect the two convex portions, the first electro-optical member exhibiting an electro-optical effect. A second electro-optical member has a recessed portion member arranged within the recessed portion, the second electro-optical member exhibiting an electro-optical effect. The permittivity of the first electro-optical member is higher than the permittivity of the second electro-optical member. The refractive index of the first electro-optical member is higher than the refractive index of the second electro-optical member. During application of an electric field, light to be transmitted is applied to the recessed portion member.

According to the optical device of the present invention, the first electro-optical member may be ferroelectric.

According to the optical device of the present invention, the second electro-optical member may be electro-optical polymer.

According to the optical device of the present invention, the second electro-optical member further may have an upper member arranged over the convex portions.

According to the optical device of the present invention, the first electro-optical member may have lateral regions spaced from the recessed portion by the convex portions.

According to the optical device of the present invention, the lateral regions may be photonic crystal.

According to the optical device of the present invention, the lateral regions may be lower than the convex portions.

MODES FOR CARRYING OUT THE INVENTION

A description will now be given of embodiments of the present invention referring to drawings.

First Embodiment

Figure 1:
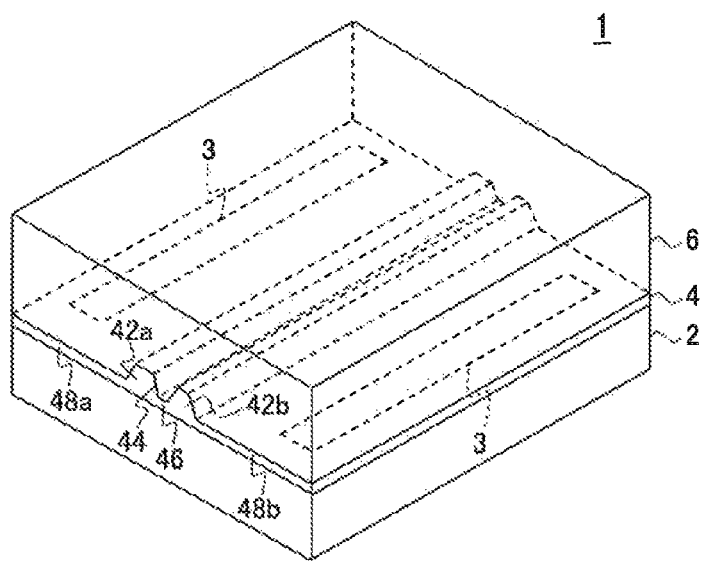
FIG. 1 is a perspective view of an optical device 1 according to a first embodiment of the present invention.
Figure 2:
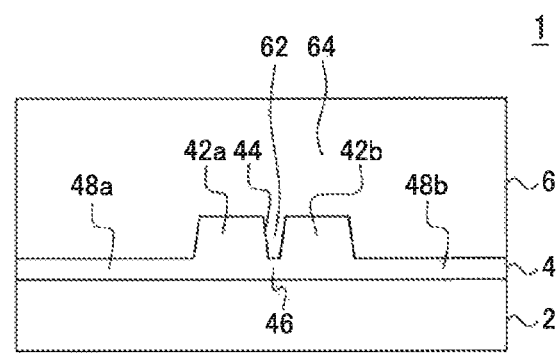
FIG. 2 is a front view of the optical device 1 according to the first embodiment.

FIG. 1 is a perspective view of an optical device 1 according to a first embodiment of the present invention. FIG. 2 is a front view of the optical device 1 according to the first embodiment.

The optical device 1 according to the first embodiment includes a substrate 2, electrodes 3, a first electro-optical member 4, and a second electro-optical member 6. It should be noted that the electrodes 3 are not shown in FIG. 2.

The substrate 2 is, for example, a sapphire substrate.

The first electro-optical member 4 is arranged on the substrate 2 and exhibits an electro-optical effect. It should be noted that the electro-optical effect here means a variation in the refractive index by an electric field. That is, application of an electric field to the first electro-optical member 4 causes a variation in the refractive index of the first electro-optical member 4.

The first electro-optical member 4 has convex portions 42a, 42b, a recessed portion 44, a connecting portion 46, and lateral regions 48a, 48b. It is noted that the convex portions 42a, 42b, the recessed portion 44, the connecting portion 46, and the lateral regions 48a, 48b may be integrated together.

The recessed portion 44 has a groove shape extending away from the near side at approximately the center of the first electro-optical member 4. Side walls of the recessed portion 44 may rise steeply with respect to the bottom of the recessed portion 44.

The two convex portions 42a, 42b extend in parallel to each other away from the near side of the first electro-optical member 4. The two convex portions 42a, 42b are spaced from each other by the recessed portion 44. The width of the convex portions 42a, 42b may be greater than the width of the recessed portion 44. The height of the convex portions 42a, 42b with respect to the bottom of the recessed portion 44 may be greater than the width of the recessed portion 44.

The connecting portion 46 is arranged under the recessed portion 44 to connect the two convex portions 42a, 42b.

The lateral region 48a is positioned laterally to the convex portion 42a and spaced from the recessed portion 44 by the convex portion 42a. The lateral region 48a is lower than the convex portion 42a.

The lateral region 48b is positioned laterally to the convex portion 42b and spaced from the recessed portion 44 by the convex portion 42b. The lateral region 48b is lower than the convex portion 42b.

The first electro-optical member 4 is, for example, PLZT, $LiNbO_3$, or $BaTiO_3$. It is noted that if the first electro-optical member 4 is PLZT, the following advantageous effects are exhibited: (1) a high permittivity of 400 to 700 and also a high refractive index of 2.4 cause an electric field and light to be concentrated within the recessed portion 44 and (2) a high electro-optical effect is brought about (EO coefficient is around 100 pm/V). It is noted that the first electro-optical member 4 may be ferroelectric.

The second electro-optical member 6 exhibits an electro-optical effect. That is, application of an electric field to the second electro-optical member 6 causes a variation in the refractive index of the second electro-optical member 6.

The second electro-optical member 6 has a recessed portion member 62 and a clad (upper member) 64 (see FIG. 2). It is noted that the recessed portion member 62 and the clad (upper member) 64 may be integrated together.

The recessed portion member 62 is arranged within the recessed portion 44 (see FIG. 2).

The clad (upper member) 64 is arranged over the convex portions 42a and 42b (see FIG. 2).

The second electro-optical member 6 is, for example, electro-optical polymer. It is noted that if the second electro-optical member 6 is electro-optical polymer, the following advantageous effects are exhibited: (1) a low permittivity of around 3 and also a low refractive index of 1.5 cause an electric field and light to be concentrated within the recessed portion 44, (2) a high electro-optical effect is brought about (EO coefficient is equal to or greater than 100 pm/V), and (3) pouring the electro-optical polymer into the recessed portion 44 causes the recessed portion member 62 to be arranged easily within the recessed portion 44.

It is noted that the permittivity of the first electro-optical member 4 should be higher than the permittivity of the second electro-optical member 6. It is also noted that the refractive index of the first electro-optical member 4 should be higher than the refractive index of the second electro-optical member 6.

For instance, if the first electro-optical member 4 is PLZT and the second electro-optical member 6 is EO polymer, the permittivity (400 to 700) of the first electro-optical member 4 is higher than the permittivity (around 3) of the second electro-optical member 6. The refractive index (2.4) of the first electro-optical member 4 is also higher than the refractive index (1.5) of the second electro-optical member 6.

The electrodes 3 are arranged on the first electro-optical member 4. The electrodes 3 are arranged on the left and right sides of the recessed portion 44. The electrodes 3 are connected to a direct-current voltage source not shown. For instance, the left electrode 3 of the recessed portion 44 is connected to the positive electrode of the direct-current voltage source, while the right electrode 3 of the recessed portion 44 is connected to the negative electrode of the direct-current voltage source.

Next will be described an operation according to the first embodiment.

Light to be transmitted through the optical device 1 is applied to the recessed portion member 62 while an electric field is applied from the direct-current voltage source not shown via the electrodes 3 to the optical device 1. In other words, the optical device 1 serves as an optical waveguide for transmission of light therethrough.

The electric field and the light are concentrated within the recessed portion member 62. This causes the light applied to the recessed portion member 62 to undergo a variation in the phase under the electro-optical effect of the second electro-optical member 6 due to the electric field that is applied to the recessed portion member 62. Application of an electric field to the optical device 1 allows to control the electric field applied to the recessed portion member 62 and therefore the phase of the light applied to the recessed portion member 62.

Light leaking from the recessed portion member 62 is also received by the convex portions 42a, 42b. The electric field applied to the recessed portion member 62 is further applied from the recessed portion member 62 through the connecting portion 46 to the convex portions 42a, 42b. This causes the light leaking into the convex portions 42a, 42b to undergo a variation in the phase under the electro-optical effect of the first electro-optical member 4 due to the electric field that is applied to the convex portions 42a, 42b. Application of an electric field to the optical device 1 allows to control the electric field applied to the convex portions 42a, 42b and therefore the phase of the light leaking into the convex portions 42a, 42b.

The phase of light to be transmitted through the optical device 1 can thus be controlled.

In accordance with the first embodiment, the phase of light applied to the optical device 1 and then concentrated within the recessed portion member 62 can be controlled under the electro-optical effect of the second electro-optical member 6.

In addition, light leaking from the recessed portion member 62 can be received by the convex portions 42a, 42b. The electric field applied to the recessed portion member 62 is further applied from the recessed portion member 62 through the connecting portion 46 to the convex portions 42a, 42b. This allows the phase of the light leaking from the recessed portion member 62 to be also controlled under the electro-optical effect of the first electro-optical member 4.

Thus, in accordance with the first embodiment, not only the light concentrated within the recessed portion member 62 but also the light leaking from the recessed portion member 62 can be controlled in phase, whereby the phase of the light applied to the optical device 1, which serves as an optical waveguide, to be better controlled.

Second Embodiment

An optical device 1 according to a second embodiment differs from the optical device 1 according to the first embodiment in that the lateral regions 48a, 48b are photonic crystal.

Figure 3:
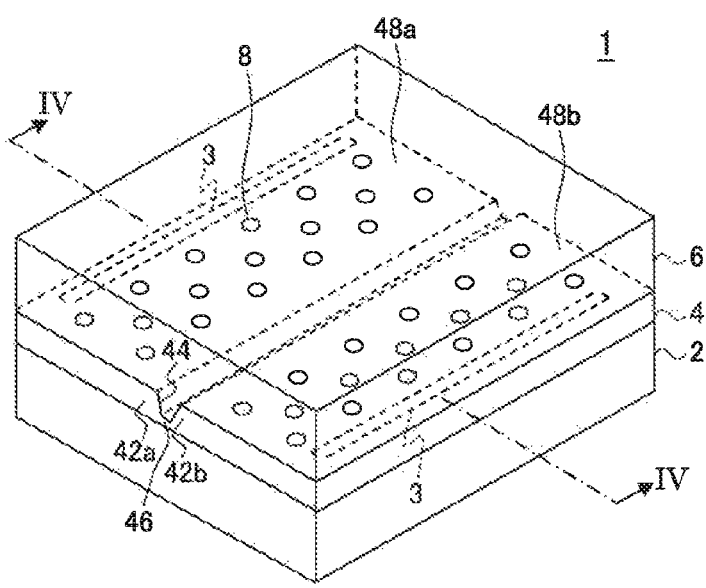
FIG. 3 is a perspective view of the optical device 1 according to the second embodiment of the present invention.
Figure 4:
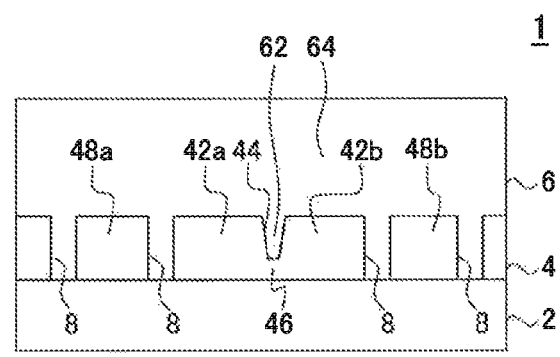
FIG. 4 is a IV-IV cross-sectional view of the optical device 1 according to the second embodiment.

FIG. 3 is a perspective view of the optical device 1 according to the second embodiment of the present invention. FIG. 4 is a IV-IV cross-sectional view of the optical device 1 according to the second embodiment. It should be noted that the electrodes 3 are not shown in FIG. 4.

The optical device 1 according to the second embodiment includes a substrate 2, electrodes 3, a first electro-optical member 4, a second electro-optical member 6, and hole portions 8. Here, components identical to those in the first embodiment are designated by the same numerals as in the first embodiment to omit the description thereof.

The substrate 2, the electrodes 3, and the second electro-optical member 6 are identical to those in the first embodiment and will not be described.

The first electro-optical member 4 is approximately identical to that in the first embodiment, where the lateral region 48a has the same height as the convex portion 42a. The lateral region 48b also has the same height as the convex portion 42b.

The hole portions 8 are column-shaped holes opened in the lateral regions 48a, 48b. The second electro-optical member 6 enters the hole portions 8. The lateral regions 48a, 48b are photonic crystal due to the presence of the hole portions 8.

An operation according to the second embodiment is approximately identical to the operation according to the first embodiment, where the speed of light in the lateral regions 48a, 48b, which are photonic crystal, is lower than in the lateral regions 48a, 48b according to the first embodiment.

The second embodiment exhibits the same effects as the first embodiment. Further, in accordance with the second embodiment, since the speed of light is lower in the lateral regions 48a, 48b, the amount of control of the phase of light can be increased compared to the first embodiment.

DESCRIPTION OF REFERENCE NUMERAL

1 Optical Device
2 Substrate
3 Electrode
4 First Electro-Optical Member
42a, 42b Convex Portions
44 Recessed Portion
46 Connecting Portion
48a, 48b Lateral Regions
6 Second Electro-Optical Member
62 Recessed Portion Member
64 Clad (Upper Member)
8 Hole Portion

The invention claimed is:

1. An optical device comprising:
a first electro-optical member having two convex portions spaced from each other by a recessed portion and a connecting portion arranged under the recessed portion to connect the two convex portions, the first electro-optical member exhibiting an electro-optical effect;
a second electro-optical member having a recessed portion member arranged within the recessed portion, the second electro-optical member exhibiting an electro-optical effect, wherein
the permittivity of the first electro-optical member is higher than the permittivity of the second electro-optical member,
the refractive index of the first electro-optical member is higher than the refractive index of the second electro-optical member,
during application of an electric field, light to be transmitted is applied to the recessed portion member,
the first electro-optical member is ferroelectric,
the first electro-optical member has lateral regions spaced from the recessed portion by the convex portions; and
an electrode that is arranged on one of the lateral regions and the electrode is positioned between the first electro-optical member and the second electro-optical member.

2. The optical device according to claim 1, wherein the second electro-optical member is electro-optical polymer.

3. The optical device according to claim 1, wherein the second electro-optical member further has an upper member arranged over the convex portions.

4. The optical device according to claim 1, wherein the lateral regions are photonic crystal.

5. The optical device according to claim 1, wherein the lateral regions are lower than the convex portions.

6. An optical device comprising:
a first electro-optical member having two convex portions spaced from each other by a recessed portion and a connecting portion arranged under the recessed portion to connect the two convex portions, the first electro-optical member exhibiting an electro-optical effect;
a second electro-optical member having a recessed portion member arranged within the recessed portion, the second electro-optical member exhibiting an electro-optical effect, wherein
the permittivity of the first electro-optical member is higher than the permittivity of the second electro-optical member,
the refractive index of the first electro-optical member is higher than the refractive index of the second electro-optical member,
during application of an electric field, light to be transmitted is applied to the recessed portion member,
the first electro-optical member is ferroelectric,
the first electro-optical member has lateral regions spaced from the recessed portion by the convex portions,
the lateral regions are photonic crystal; and
an electrode that is arranged on one of the lateral regions and the electrode is positioned between the first electro-optical member and the second electro-optical member.

7. The optical device according to claim 6, wherein the second electro-optical member is electro-optical polymer.

8. The optical device according to claim 6, wherein the second electro-optical member further has an upper member arranged over the convex portions.

9. The optical device according to claim 6, wherein the lateral regions are lower than the convex portions.

* * * * *